United States Patent

[11] 3,581,875

| [72] | Inventor | Paul M. A. Guis<br>133 Bis Rue Mouneyra, Bordeaux,<br>(Gironde), France |
|---|---|---|
| [21] | Appl. No. | 705,467 |
| [22] | Filed | Feb. 14, 1968 |
| [45] | Patented | June 1, 1971 |
| [32] | Priority | Mar. 14, 1967 |
| [33] | | France |
| [31] | | 1,515,395 |

[54] ROLLER CONVEYOR
8 Claims, 10 Drawing Figs.

[52] U.S. Cl. .................................................. 198/127, 198/203
[51] Int. Cl. .................................................. B65g 13/02
[50] Field of Search .......................................... 198/127, 203, 160

[56] References Cited
UNITED STATES PATENTS

| 3,138,238 | 6/1964 | Good et al. | 198/127 |
|---|---|---|---|
| 3,189,161 | 6/1965 | Schneider et al. | 198/127 |
| 3,012,652 | 12/1961 | Poel et al. | 198/127 |
| 3,198,411 | 8/1965 | Cope | 193/37 |
| 3,465,489 | 9/1969 | Monaghan | 198/92 |
| 3,306,430 | 2/1967 | Fogg | 198/127 |
| 1,967,747 | 7/1934 | Eggleston | 198/127 |
| 3,170,562 | 2/1965 | Eyster | 198/127 |
| 3,141,544 | 7/1964 | Hansen | 198/203 |
| 3,193,087 | 7/1965 | Hahn | 198/203 |
| 3,132,736 | 5/1964 | May et al. | 198/127 |
| 2,836,284 | 5/1958 | Gilliatt | 198/127 |

*Primary Examiner*—Andres H. Nielsen
*Attorney*—Michael S. Striker

ABSTRACT: A roller conveyor wherein the load-supporting and transporting rollers are rotatable on shafts which are installed in stationary walls provided with oversized openings or vertical slots. The rollers rest by gravity on one or more aprons forming part of apron conveyors whose chains are driven by one or more reversible motors. When the aprons travel, their upper surfaces transmit rotary motion to the rollers by friction so that the load travels in a direction counter to that in which the aprons are driven by the chains. The shafts of the rollers are movable up and down with reference to the walls and are provided with flats which engage the surfaces of walls to prevent rotation of shafts with the rollers. The upper surface of each apron and/or the peripheral surfaces of the rollers can be provided with coats of friction generating material. Selected rollers can be disengaged from the aprons to arrest the load.

PATENTED JUN 1 1971
3,581,875
SHEET 1 OF 2
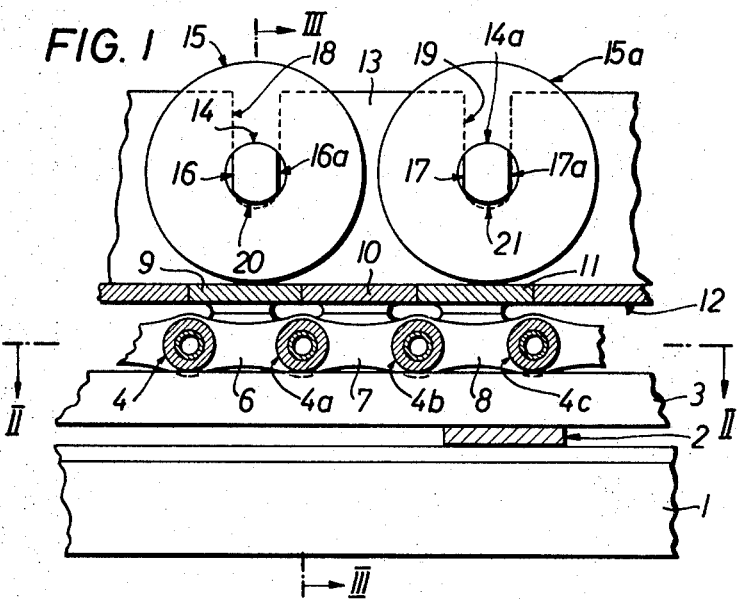
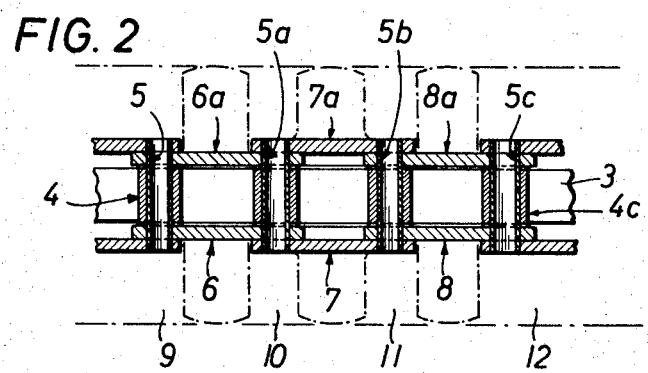
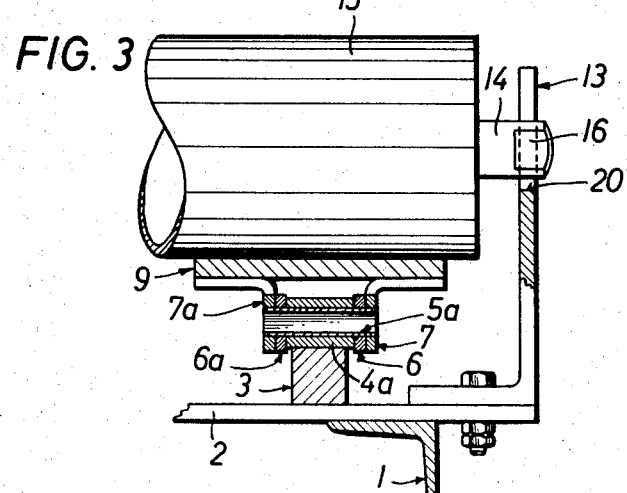
INVENTOR
Paul Marius Antoine Guis
BY Michael S. Striker
Attorney

PATENTED JUN 1 1971

INVENTOR
Paul Marius Antoine Guis

BY Michael S. Striker
Attorney

ROLLER CONVEYOR

BACKGROUND OF THE INVENTION

The present invention relates to conveyors in general, and more particularly to improvements in roller conveyors. Still more particularly, the invention relates to improvements in roller conveyors of the type whose shafts are not positively driven by a motor, chain or the like.

It is already known to employ roller conveyors for transportation of loads. The load is placed onto the upper portions of rollers and is advanced because the rollers are mounted at different levels to form a ramp along which the load travels by gravity. Such rollers need not be positively driven. It is also known to provide the rollers of a roller conveyor with live shafts so that the rollers may be mounted in a horizontal plane and the load advances because the rollers receive motion from their shafts. Such roller conveyors are relatively complicated and expensive because each shaft must be coupled to a drive and because each shaft must be installed in several antifriction bearings which require frequent inspection, repair or replacement.

It is also known to employ roller conveyors in the form of chains. In such conveyors, the rollers of the chains must be properly supported against sagging under heavy loads. Moreover, the conveyors must be provided with complicated tensioning devices to compensate for stretching of chains and the links undergo excessive wear. The rolls of chains must be mounted in exact parallelism with each other to prevent twisting and resulting destruction.

SUMMARY OF THE INVENTION

It is an object of the present invention to provide a novel and improved roller conveyor wherein the shafts of rollers need not be driven and which can be utilized to transport lightweight or heavy loads in horizontal or inclined paths.

Another object of the invention is to provide a roller conveyor wherein the moving parts undergo less wear than in heretofore known roller conveyors and which can be assembled of readily available components.

A further object of the invention is to provide a roller conveyor which can be used to transport gently hot, cold, granular, pulverulent or other materials back and forth, which can arrest a load in a desired position and practically instantaneously, and which can be operated manually, semiautomatically or by resorting to a fully automatic programming system.

An additional object of the invention is to provide a roller conveyor which can safely transport oddly shaped, bulky or compact goods, which can be used for transportation of goods without shaking, vibration or other undesirable movements, and which can be operated by persons having little skill.

Still another object of the invention is to provide a roller conveyor which can be used for transport of goods from a lower level to a higher level or vice versa and which can be made longer or shorter with little loss in time.

A concomitant object of the invention is to provide a roller conveyor which can be converted from transport of lightweight goods to transport of relatively heavy goods, which can be readily assembled and dismantled with little loss in time, and which can be used as a superior substitute for presently known roller conveyors, apron conveyors, chain conveyors or like material-transporting devices.

In its simplest form, the improved roller conveyor comprises a series of load-supporting rollers and at least one travelling apron having an upper surface providing a support for and frictionally engaging the peripheral surfaces of rollers from below to rotate the rollers whereby the load travels in a direction counter to that in which the apron travels. Friction between the rollers and the apron can be increased by coating the apron and/or the rollers with suitable friction-generating materials. The shafts for the rollers are preferably held against rotation and can be mounted in stationary supports adjacent to the axial ends of rollers and provided with oversized openings or with vertical slots for the shafts so that the shafts can move up and down and normally assume positions in intermediate portions of the openings or slots to insure that the rollers can rest on the apron by gravity.

The apron forms part of an apron conveyor which further includes an endless chain whose upper stringer extends above a stationary guide rail mounted in or forming part of a stationary frame. The rolls of the chain travel along the rail and are coupled to each other by links which carry plates forming part of the apron. Such plates preferably form a continuous smooth-surfaced apron which is located between the rollers and the rolls of the upper stringer to insure that the rollers will travel along a smooth surface to prevent shifting of conveyed goods or spillage of granular, pulverulent or liquid materials in containers which might be transported by the rollers. As the load upon the rollers increases, friction between the rollers and the apron also increases to insure that the rollers continue to rotate even if they carry relatively heavy loads.

Selected rollers can be lifted off the apron or aprons to arrest the goods in selected positions and to thus permit treatment of such goods at one or more processing stations in an automatic production line, for example, in a rolling mill.

The novel features which are considered as characteristic of the invention are set forth in particular in the appended claims. The improved roller conveyor itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

FIG. 1 is a fragmentary partly elevational and partly longitudinal sectional view of a roller conveyor which embodies one form of the invention;

FIG. 2 is a horizontal sectional view as seen in the direction of arrows from the line II—II of FIG. 1;

FIG. 3 is an enlarged fragmentary transverse vertical sectional view as seen in the direction of arrows from the line III—III of FIG. 1;

DESCRIPTION OF THE PREFERRED EMBODIMENTS

Figure 4:
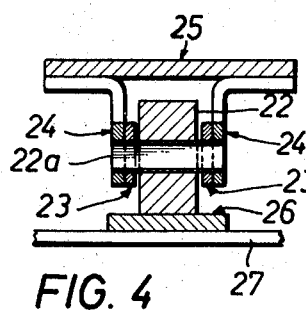
FIG. 4 is a transverse vertical sectional view of the chain in a modified roller conveyor.

Referring first to FIGS. 1 to 3, there is shown a roller conveyor whose rollers (only rollers 15 and 15a are shown) are driven by an apron conveyor. The latter comprises two endless chains (one shown) which are mounted in a metallic frame 1 provided with transversely extending bars 2 for two elongated guide rails 3. The rollers 4, 4a, 4b, 4c (hereinafter called rolls to distinguish from rollers 15, 15a) of the chain which is shown in FIGS. 1 to 3 travel along the upper side of the guide rail 3 and are coupled to each other by links 6, 6a, 7, 7a and 8, 8a. The rolls 4—4c are respectively provided with hollow pins 5—5c for the respective ends of the links 6—8a. The links of the chain are rigidly connected or integrally formed with plates 9—12 which together form a continuous apron along the upper stringer of the chain. The numeral 13 denotes a stationary support or sidewall for the rollers 15, 15a. This support is bolted to the frame 1 as shown in FIG. 3 and is provided with vertically extending recesses or slots 18, 19 for the shafts 14, 14a of the rollers 15, 15a. The bottom zones of the slots 18, 19 are respectively bounded by concave semicircular surfaces 20, 21. The shafts 14, 14a are respectively provided with flats or facets 16, 16a and 17, 17a which are fitted into the slots 18, 19 in such a way that the shafts cannot rotate with reference to the support 13 but are movable up and down away from or toward the apron including the plates 9—12. A second support 13 (not shown) is provided for the shafts 14, 15 at the other axial ends of the rollers 15, 15a. Also, the other chain is disposed in a vertical plane which is adjacent to the left-hand axial ends of the rollers 15, 15a, as viewed in FIG. 3.

When a load is placed onto those portions of the rollers 15, 15a which extend upwardly and beyond the supports 13 and the chains are driven to move the rolls 4—4c in a direction to the right, as viewed in FIG. 1, the apron (plates 9—12) participates in such movement and causes the rollers 15, 15a to rotate in a counterclockwise direction so that the load advances in a direction to the left. Thus, the direction of load travel is opposite to the direction of travel of the upper stringers of the chains along the rails 3. The axes of the shafts 14, 14a are normal to the direction of travel of the plates 9—12. When the rollers 15, 15a do not support a load, the wear on the aprons is practically nil because the plates of the aprons merely carry the weight of rollers and their shafts. Also, and since the shafts need not rotate, the surfaces bounding the cutouts 18, 19 and the surfaces on the end portions of shafts undergo minimal wear.

FIG. 4 illustrates a portion of a modified roller conveyor which includes a frame having tranversely extending horizontal bars 27 for an elongated guide rail 26. The rolls 22 of the chain shown in FIG. 4 travel along the top surface of the rail 26 and their pins 22a are coupled with chain links 23, a and 24, 24a. These links carry plates 25 which together form a continuous apron at a level above the upper stringer of the chain. The supports 13 (not shown in FIG. 4) support the rollers (corresponding to the rollers 15, 15a) in the same way as shown in FIGS. 1 and 3. The main difference between the embodiments of FIGS. 1—3 and 4 is that the axial length of the rolls 22 is less than the axial length of the rolls 4—4c and that the rolls 22 extend downwardly and upwardly beyond the links 23—24a. The plates 25 of the apron shown in FIG. 4 can be welded, bolted or otherwise rigidly and permanently or detachably connected to the links 23—24a. Also, the plates 25 can form integral parts of the links.

Figures 5, 6:
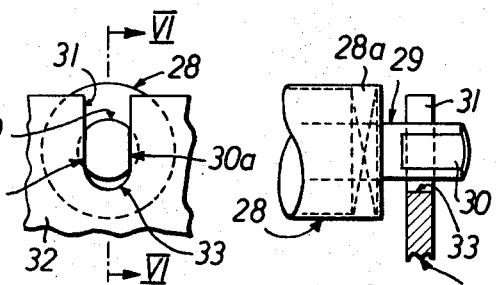
FIG. 5 is a fragmentary side elevational view of a third roller conveyor.
FIG. 6 is a sectional view as seen in the direction of arrows from the line VI—VI of FIG. 5.

FIGS. 5 and 6 illustrate a portion of a third roller conveyor wherein the roller 28 carries an antifriction bearing 28a for the shaft 29. The latter has two flats 30, 30a which fit into the slot or recess 31 of the support 32. The bottom zone of the slot 31 is bounded by a rounded concave surface shown at 33. The bearing 28a may be a conventional ball bearing, roller bearing or needle bearing. The other end of the shaft 29 is mounted in similar fashion in a second bearing provided at the other end of the roller 28. The second support (not shown) at the other axial end of the roller 28 is preferably a mirror symmetrical replica of the support 32. The chain or chains whose apron or aprons support and transmit motion to the roller 28 of FIGS. 5 and 6 may be constructed and assembled in a manner as shown in FIGS. 1—3 or in FIG. 4.

Figure 7:
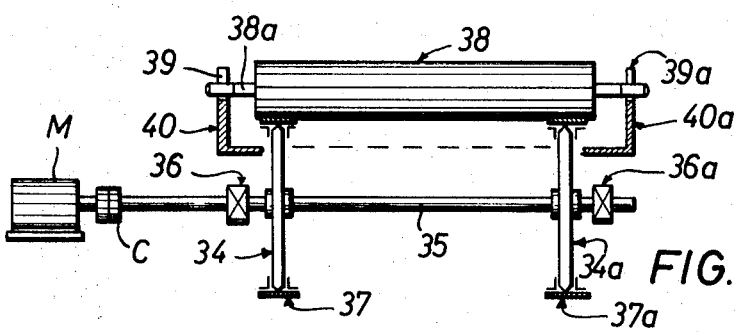
FIG. 7 is a transverse vertical sectional view of the end turn in a roller conveyor with two chains.

FIG. 7 shows one end turn of two chains which are provided with aprons for rollers 38 whose shafts 38a are received in two supports 40, 40a provided with registering slots 39, 39a for the corresponding end portions of the shafts 38a. The two chains (represented by their aprons 37, 37a are trained around sprocket wheels 34, 34a fixed to a common shaft 35 which is mounted in antifriction bearings 36, 36a and is driven by a reversible variable-speed electric motor M or another prime mover. The supports 40, 40a are stationary and the rollers 38 rest by gravity on the aprons 37, 37a which later provide two continuous supporting and motion-transmitting surfaces for the rollers. The friction between the aprons 37, 37a and the peripheral surfaces of the rollers 38 increases when a load is placed onto those portions of the rollers which extend above the supports 40, 40a. The other end turn of the two chains comprises two additional sprocket wheels corresponding to the sprocket wheels 34, 34a. However, the shaft for these additional sprocket wheels need not be driven, i.e., it is normally sufficient to drive the sprocket wheels at one end turn of the two chains. It is clear that the roller conveyor of FIG. 7 may include a single chain or three or more chains, depending on the intended use of the conveyor, mainly upon the weight of goods or workpieces which are to be transported by the rollers 38. The motor M drives the shaft 35 through the intermediary of a conventional clutch C which can be operated manually or automatically.

Since the width of the aprons 37, 37a is considerably less than the axial length of the rollers 38, the two apron conveyors can be assembled with substantial savings in material. Moreover, such construction reduces the overall weight of the conveyor which is important when it becomes necessary to start or arrest the motor M at frequent intervals. If the aprons 37, 37a are replaced by a single apron, the latter is preferably (but not necessarily) placed midway between the axial ends of the rollers 38.

Figure 8:
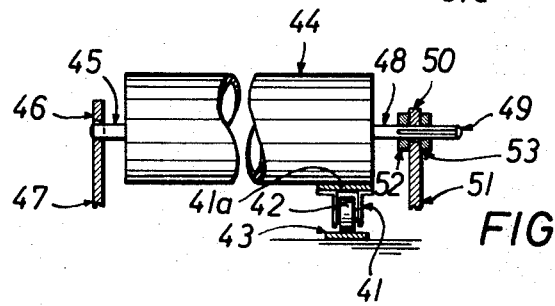
FIG. 8 is a fragmentary transverse vertical sectional view of a roller conveyor with a single chain.

FIG. 8 illustrates a portion of a roller conveyor with a single endless chain. The rolls 42 of the chain travel along a stationary guide rail 43 which is mounted on the frame. The pins of the rolls 42 are coupled with links 41 which carry plates 41a together forming a continuous apron for the right-hand end portions of the rollers 44 whose shafts 45 are mounted in two supports 47, 51. The left-hand end of each shaft 45 is received with freedom of vertical movement in a cutout 46 which is constituted by an oversized opening in the support 47. The other end portion 48 of each shaft 45 is provided with a pair of flats 49 received with freedom of movement up and down in vertical slots 50 provided in the right-hand support 51. Each end portion 48 carries a pair of rings or washers 52, 53 disposed at the opposite sides of the support 51 to hold the shaft 45 against axial movement. The supports 47, 51 are affixed to the frame which carries the guide rail 43.

Figure 9:
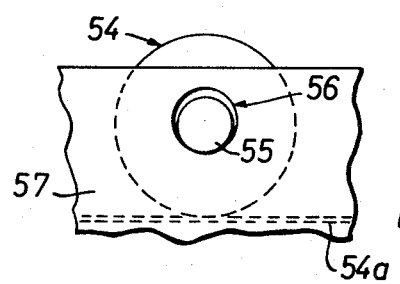
FIG. 9 is a fragmentary side elevational view of a further roller conveyor.

FIG. 9 illustrates in greater detail the manner in which the end portion of a shaft 55 for a roller 54 can be mounted in an oversized opening 56 provided in a stationary support 57. The illustrated end portion of the shaft 55 is without flats and the diameter of the opening 56 exceeds the diameter of this end portion so that the shaft can move in all radial directions with reference to the support 57 within the confines of the surface bounding the opening 56. The apron for the roller 54 is shown at 54a. The structure of FIG. 9 can be employed in the left-hand part of the roller conveyor shown in FIG. 8.

Figure 10:
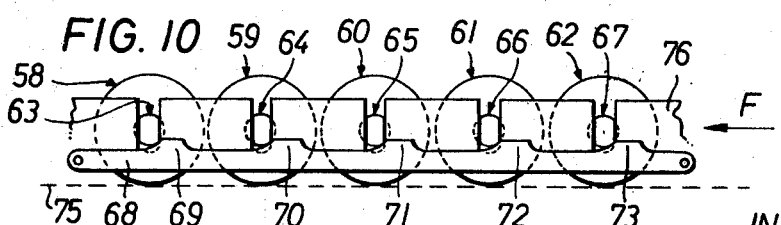
FIG. 10 is a fragmentary side elevational view of still another roller conveyor which is provided with means for disengaging the rollers from the travelling apron.

FIG. 10 illustrates a roller conveyor which is provided with means for temporarily disengaging the rollers 58—62 from the apron 75. The shafts 63—67 of the rollers 58—62 are provided with flats which are received in slots provided therefor in two supports 76 (only one shown). The apron 75 forms part of an endless chain which is driven to move the apron in the direction indicated by arrow F. The means for temporarily disengaging the rollers 58—62 from the apron 75 comprises a pair of elongated racks 68 (one shown) which are carried by the respective supports 76 or directly by the frame of the roller conveyor and are movable back and forth in and counter to the direction indicated by arrow F. Each rack 68 has a set of upwardly extending projections or lobes 69—73 which are movable into and away from engagement with the shafts 63 to 67. When the rack 68 of FIG. 10 is shifted in a direction to the left (arrow F), the lobes 69—73 respectively lift the shafts 63—67 whereby the rollers 58—62 are lifted above and away from the apron 75 so that they cease to rotate in a clockwise direction (it having been stated that the apron 75 travels in the direction indicated by arrow F). In this way, the load carried by rollers 58—62 can be arrested practically instantaneously for a desired period of time without necessitating stoppage of the apron 75. This is desirable when a row of workpieces is being transported past several treating stations where the workpieces must be brought to a halt to undergo a certain type of treatment. The slots in the supports 76 are long enough to permit vertical movements of shafts 63—67 such as are necessary to insure that the rollers 58—62 can be disengaged from the apron 75. The supports 76 are stationary. However, it is equally within the purview of the present invention to provide the roller conveyor with supports which can be moved up and down to thereby move the rollers away from or into frictional motion-receiving engagement with one or more aprons. The racks 68 can be long enough to lift all of the rollers in the conveyor away from the apron 75.

Lifting of rollers above and away from the apron 75 requires less energy than a stoppage of chains, and such lifting can arrest the load much faster than stoppage of chains, especially if the chains are driven at a high speed and if the plates of the apron 75 are heavy.

It will be seen that the apron or aprons of the improved roller conveyor not only support but also transmit motion to the rollers. The rollers rotate in response to frictional engagement with the upper surfaces of travelling aprons. As a rule, the shafts of the rollers are mounted in such a way that they cannot reach the lower ends of the respective slots or holes, i.e., the end portions of the shafts normally extend into intermediate portions of the slots. This insures satisfactory frictional engagement between the peripheral surfaces of the rollers and the upper surfaces of the aprons. The load travels in a direction counter to that in which the aprons travel. By the simple expedient of reversing the direction of travel of the aprons, the load can be advanced in either direction. This is shown in FIG. 7 which illustrates the reversible variable-speed electric motor M connected with the common shaft 35 of the sprocket wheels 34, 34a by means of the clutch C.

The improved roller conveyor can be assembled of parts which are readily available on the market. All that is necessary is to employ one or more conventional apron conveyors, a frame for these conveyors, a pair of supports, and a set of rollers, for example, the rollers 38 shown in FIG. 7. At the present time, the improved roller conveyor preferably employs one or more aprons whose plates provide a continuous supporting surface above the upper stringers of the respective chains. Thus, the plates form a series of closely adjacent elements which may be of square, rectangular or other polygonal outline and which may but need not be of constant thickness. Plates in the form of strips or arcuate plates can be used just as well. A flat and uninterrupted supporting surface at the upper side of the apron insures smooth rotation of rollers and reduces the wear on the components of the roller conveyor. This also insures that the load does not vibrate during transport by the rollers and that the load cannot change its orientation during travel from roller to roller. As a rule, the plates of the aprons will be made of steel or other suitable metallic material. However, it is also possible to employ nonmetallic materials or a combination of metallic and plastic or other substances. In order to insure more satisfactory frictional engagement between the peripheral surfaces of the rollers and the plates of the apron or aprons, the plates and/or the rollers can be coated with suitable materials, particularly with certain types of plastic, such as Ferrodo or Teflon (trademarks). Other types of friction-generating materials can be used with equal advantage.

Though the drawings show rollers whose shafts are provided with flats so that they cannot rotate with reference to the respective supports, it is also contemplated to use shafts which are rigid with the respective rollers and are rotatable in bushings or the like installed in the supports and movable up and down to account for deformation of aprons and/or rollers in response to changes in load. Since the upper surfaces of the aprons are preferably flat, each roller engages the upper surface of each apron along a line which extends in parallelism with its axis. Thus, the weight of rollers and of the loads thereon is transmitted to the aprons in directions which are normal to the planes of their upper surfaces, i.e., at right angles to the direction of travel of the chains. This insures very satisfactory friction between the rollers and the aprons to normally prevent relative movement between the rollers and the apron plates which could cause excessive wear on such parts.

The improved roller conveyor possesses several important advantages over presently known roller conveyors, particularly as regards the simplicity of its construction, availability of its component parts, ease of assembly, dismantling, lengthening, shortening, reversal of the direction of load travel, acceleration or deceleration of load, instant or practically instant stoppage of load, and ready accessibility of its parts for inspection cleaning and/or repair. Each roller can be removed or reinserted by hand independently of the other rollers and all bearings can be readily lubricated. Moreover, the rollers can transport a wide variety of loads including oddly shaped goods and very hot goods, for example, red hot metallic bars, plates, rods or the like. The conveyor can be employed with advantage in rolling mills to transport hot metallic workpieces back and forth whereby the rollers insure that the goods cannot contact the aprons and/or chains so that the conveyor can be employed without necessitating the use of expensive cleaning or other auxiliary equipment. The conveyor is equally useful in transportation of containers for granular or pulverulent materials which are likely to escape or spill. Any material which descends onto the upper surface of an apron is simply transported to the end turn of the respective chain and is discharged when the plates of the apron move from the upper to the lower stringer of the chain. The gaps between the rollers are wide enough to permit granular or pulverulent material to descend onto the aprons.

Since the rollers are insertable, withdrawable and movable up and down independently of each other, the lifting or disengaging device of FIG. 10 (or an analogous disengaging device) can be provided for any selected group or groups of rollers to move such rollers away from frictional engagement with the aprons. This insures that the load can be arrested during travel along the rollers for desired periods of time, for example, to undergo treatment at one or more stations in an automatic or semiautomatic production line. Such stoppage of loads can be effected without arresting the chains for the aprons and without necessitating a deceleration of chain drives. As stated before, the plates of the aprons may resemble rectangles, squares, rhomboids, strips, trapezoids or other regular or irregular geometric forms without departing from the spirit of the present invention. The edges of the plates may be rounded or sharply defined to insure smooth travel of rollers from plate to plate. It is further clear that the rollers may be disposed in groups of two, three or more coaxial rollers with stationary bearings for a common shaft provided between the rollers of each group. Such stationary bearings may resemble the structure shown in FIG. 9. For example, each group of rollers may include two coaxial rollers rotatable on a common shaft whose end portions are provided with flats and are mounted in supports of the type shown in FIG. 5 and whose median portions extend through oversized openings provided in supports of the type shown in FIG. 9.

The roller conveyor of the present invention can be used for transportation of lightweight goods as well as for transportation of very heavy loads. If the load is too heavy, its weight is preferably taken up by several rollers so that such rollers cannot undergo excessive deformation. Furthermore, and if the load is so heavy that friction between the rollers and the aprons does not suffice to maintain the rollers in rotary motion, the load simply comes to a halt while the aprons slide with reference to the peripheral surfaces of the rollers. The same effect is produced if the forward movement of the load is blocked, i.e., the rollers then come to a halt and the aprons continue to move with the chains or the rollers rotate in response to travel of aprons but the load remains at a standstill.

As stated before, the disengaging device of FIG. 10 constitutes but one of several devices which can be employed to disengage the rollers from the apron or aprons. This purely mechanical disengaging device can be replaced by suitable pneumatic, hydraulic or electrical devices, for example, by electromagnets which can lift the shafts of rollers upwardly and away from the aprons or by hydraulic or pneumatic cylinders which operate between the frame and the shafts for the rollers. The operation of the drive or drives for the chains and the operation of mechanisms for actuating the displacing or disengaging devices can be controlled by hand or by suitable programming systems. The programming systems may be used to operate the roller conveyor in a production line so that the aprons are advanced at one or more speeds and that selected rollers are disengaged from the aprons at predetermined intervals, for example, whenever a workpiece which is being advanced by the rollers reaches a certain station where it must undergo a material removing, cleaning, inspecting or other treatment. The programming system may be semiautomatic or fully automatic and it may control the operation of certain portions or of the entire conveyor.

In order to avoid cutting, the roller conveyor of the present invention can be provided with a horizontal member of profiled metal which is formed with teeth corresponding to the thickness of flattened end portions of the shafts.

If the roller conveyor comprises two aprons, the chains for the aprons are preferably identical. If a single chain is used, the apron can be placed midway between the axial ends of the rollers or off center in a manner as shown in FIG. 9. The aforementioned teeth of the profiled member are then provided with vertical flanks which engage the shafts (see the shaft 55 in FIG. 9) from two sides to prevent lateral wobbling of shafts in the openings 56. In such instances the end portions of shafts 55 in the openings 56 are preferably provided with flats to engage with the vertical flanks. This saves special bearing discs for centering of the shafts 55 and enables the manufacturer of the roller conveyor to employ available rollers, i.e., rollers having shafts which are provided with flats at both ends.

Without further analysis, the foregoing will so fully reveal the gist of the present invention that others can, by applying current knowledge, readily adapt it for various applications without omitting features which fairly constitute essential characteristics of the generic and specific aspects of the above-described contribution to the art.

What I claim as new and desire to be protected by Letters Patent is set forth in the appended claims.

1. A roller conveyor comprising rigid frame means including an elongated rail and a pair of elongated members extending substantially parallel to and to opposite sides of said rail and rigidly connected thereto, said members being formed with spaced vertically extending slots; at least one apron conveyor including at least one endless chain composed of rolls engaging said elongated rail to be supported thereon, links articulately connected to said rolls, a travelling apron comprising a plurality of rigid metal plates respectively rigid with said links and arranged to form a substantially uninterrupted substantially plane upper support surface, and drive means for driving said chain; and a series of load-supporting rollers each having a shaft having opposite ends respectively located in and guided for vertical movement in said slots of said elongated members, the depth of said slots being such that the shafts are located in intermediate portions of said slots when the corresponding load-support rollers rest on said apron to thus assure a positive engagement between said load-supporting rollers and said upper support surface formed by said rigid plates while the latter are nonyieldably supported by said chain and said rail to thereby provide a great load-carrying capacity for said roller conveyor.

2. A roller conveyor as defined in claim 1 wherein the width of said apron is a fraction of the axial length of said rollers.

3. A roller conveyor as defined in claim 1, wherein said conveyor comprises a pair of travelling aprons each supporting said rollers adjacent to one axial end thereof.

4. A roller conveyor as defined in claim 1, wherein said apron is provided with a coating of friction-generating material along said upper surface thereof.

5. A roller conveyor as defined in claim 1, wherein at least some of said rollers are provided with coats of friction-generating material.

6. A roller conveyor as defined in claim 1, wherein each of said rollers include a group of coaxial rollers.

7. A roller conveyor as defined in claim 1, and including friction-reducing means interposed between said rollers and the respective shafts, said opposite ends of said shafts being held in said slots against rotation.

8. A roller conveyor comprising a series of load-supporting rollers; a shaft having opposite ends for each roller; at least one apron conveyor including at least one endless chain, drive means for said chains, and a travelling apron driven by said chain and comprising a plurality of rigid portions which are movable relative to each other and provide a substantially uninterrupted substantially plane upper surface providing a support for directly engaging said rollers from below to rotate said rollers by friction; frame means comprising an elongated rail supporting said chain from below and a pair of elongated members extending transverse to the axes of said load-supporting rollers and being each formed with a plurality of vertically extending slots in which said opposite ends of said shaft are respectively guided movable in vertical direction, the depth of said slots being such that the shafts extend into intermediate portions of the respective slots when the corresponding rollers rest on said apron to thus assure positive engagement between said rollers and said upper surface of said apron; and means for disengaging selected rollers from said apron, said disengaging means comprising means for lifting selected shafts in a direction upwardly and away from said apron to thereby disengage the corresponding rollers from said upper surface.